(12) United States Patent
Gens et al.

(10) Patent No.: US 8,549,793 B1
(45) Date of Patent: Oct. 8, 2013

(54) FLASHING SYSTEM

(75) Inventors: Lothan Gens, Bad Berleburg (DE); Marco Schneider, Breidenbach (DE)

(73) Assignee: EJOT Baubefestigung GmbH, Bad Laasphe (DE)

( * ) Notice: Subject to any disclaimer, the term of this patent is extended or adjusted under 35 U.S.C. 154(b) by 0 days.

(21) Appl. No.: 13/601,455

(22) Filed: Aug. 31, 2012

(51) Int. Cl.
*E04D 1/36* (2006.01)

(52) U.S. Cl.
USPC .................................. 52/58; 52/59; 52/302.6

(58) Field of Classification Search
USPC ........... 52/58, 173.3, 25, 59, 302.6; 277/606; 4/252.6
See application file for complete search history.

(56) References Cited

U.S. PATENT DOCUMENTS

| | | | |
|---|---|---|---|
| 3,334,774 A * | 8/1967 | Poltorak | 220/378 |
| 8,122,648 B1 * | 2/2012 | Liu | 52/58 |
| 8,151,522 B2 * | 4/2012 | Stearns et al. | 52/58 |
| 8,245,454 B2 * | 8/2012 | Stearns et al. | 52/58 |

* cited by examiner

*Primary Examiner* — Jeanette E Chapman
*Assistant Examiner* — Daniel Kenney
(74) *Attorney, Agent, or Firm* — Wood, Phillips, Katz, Clark & Mortimer

(57) ABSTRACT

The present invention provides a flashing system for roof mounting equipment which reliably prevents water from reaching the substructure of the roof. The flashing system comprises a flashing plate having upper and lower surfaces, and at least one hole extending therethrough for receiving a fastener. A first seal is arranged at the lower surface of the flashing plate, and a second seal is arranged at the lower surface of the flashing plate surrounding the first seal, wherein the thickness of the first seal is greater than the thickness of the second seal. The thickness relation is provided when the flashing system is installed and both seals are compressed. A third seal, which receives the fastener therethrough, can be provided at the upper surface of the flashing plate.

14 Claims, 2 Drawing Sheets

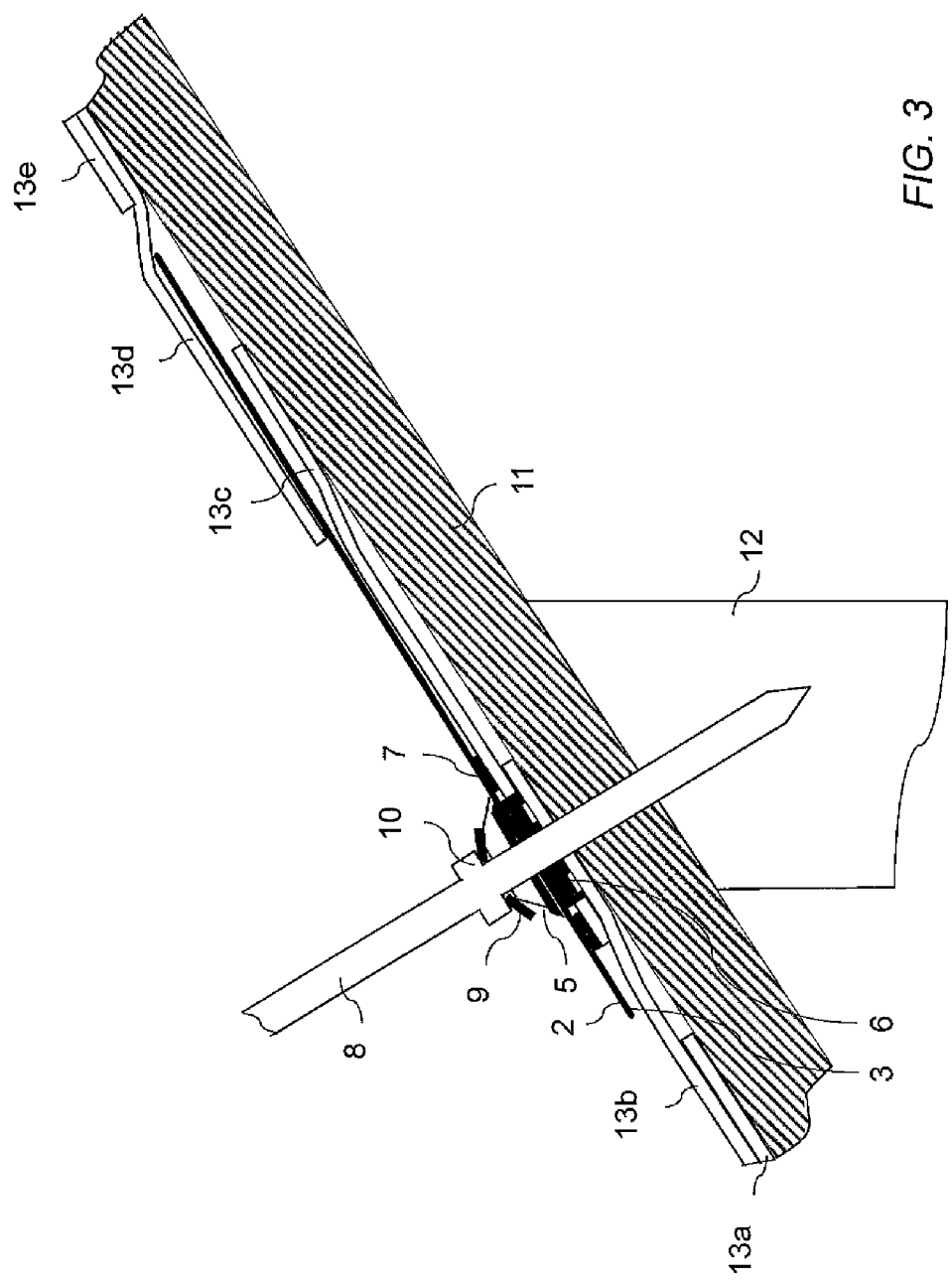

FLASHING SYSTEM

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

The present invention relates to a flashing system. More specifically, the invention relates to a flashing system for mounting equipment, as for example solar equipment, onto a roof and sealing the roof.

BACKGROUND OF THE INVENTION

Mounting equipment on roofs becomes more popular on residential buildings these days, for example, solar equipment is mounted on roofs for water heating purposes or for generating electricity. Residential buildings commonly have a roof comprising layers of shingles, whereby the shingles are arranged such that they partially overlap each other. The shingles serve the purpose to protect the roofs' substructure from any leakage of water in rainy conditions. However, when equipment is secured on the roof by, for example, means of fasteners, this protective shingle layer is damaged by the fasteners. Hence, in order not to impair the sealing and the protective functionality of the shingle layer, each point of entry has to be sealed.

There are currently different systems known, which provide sealing capabilities for roof mounted equipment.

For example U.S. Pat. No. 8,122,648 B1 shows a roof mounting system having a flashing plate with a hole extending therethrough. The flashing plate can be placed onto the shingle layer, preferably in between two shingles, and the hole in the flashing plate can be co-aligned with a borehole through the shingle layer into the substructure of the roof, in order to accommodate a fastener, for securing equipment onto the roof. The flashing plate is tapered at the hole, such that a flat area is avoided and water is diverted around the hole and therefore in turn around the fastener extending through the hole, such that water coming from above, is substantially restrained from leaking into the hole and reaching the substructure of the roof. Also, by pressing the flashing plate by means of the fastener onto the uppermost shingle on which the flashing plate is placed, a seal is created between the flashing plate and the uppermost shingle can be achieved.

U.S. Pat. No. 8,166,713 B1 shows a roofing system comprising a flashing plate similar to the aforementioned one, which however further encompasses a seal arranged beneath the flashing plate contacting the flashing plate and the uppermost shingle onto which it is placed, such that when by means of a fastener pressure is exerted upon the flashing plate, the seal is compressed and a seal is formed between the flashing plate and the uppermost shingle.

However, such known systems can still not completely prevent that water can reach the substructure of the roof, especially when located close to or right between the edges of the shingles.

Hence, there exists a need for a system to provide a seal for roof mounting equipment that reliably prevents that water reaching the substructure of the roof in order to avoid any damage. Focusing on a secure fastening in the center of the rafters, the mounting positioning in relation to the shingles cannot be influenced on site, which often results in fastening positions close and/or near the edge of shingles, which outruns a reliable sealing performance of most available systems underneath the flashing. Further, the system should also be quick mountable and easy to handle. The present invention accomplishes these objectives.

SUMMARY OF THE INVENTION

The present invention comprises a flashing system providing a seal for roof mounting equipment, which reliably prevents water reaching the substructure of the roof.

The present invention provides a flashing system comprising a flashing plate having an upper surface and a lower surface and at least one hale extending through the flashing plate, wherein the hole having a flanged upwardly projecting edge and the hole is adapted to receive at least a portion of a fastener therethrough, a first seal arranged at the lower surface of the flashing plate surrounding the hole and adapted to receive at least a portion of the fastener therethrough, a second seal arranged at the lower surface of the flashing plate surrounding the first seal and wherein the thickness of the first seal is greater than the thickness of the second seal. Thereby, this thickness relation is in particular given, when the flashing system is installed and both seals are compressed. Further, the hole in the flashing plate is adapted in such a way that it defines an opening in the flashing plate to accommodate a fastener therethrough. Thereby, the opening has a dimension, which at least equates to the cross-sectional dimensions of the fastener which is used for securing the equipment onto the roof.

The following aspects provide additional advantages and benefits of the present invention.

In one aspect, the first seal and/or the second seal may be circular seals. For example, the first seal and/or the second seal may be o-seals arranged at the lower surface of the flashing plate surrounding the hole therethrough, wherein the characteristics of an o-seal in their entirety would fall under the definition of circular in the sense of the invention. Also, only an inner edge and/or an outer edge of the first seal and/or the second seal may be round edges, which would still fail within the scope of circular in the sense of the invention, wherein inner and outer refers to the distance of the edges from a center of the hole in the flashing plate. However, it is contemplated that any form feasible to surround the hole in the flashing plate can be used.

In one aspect, the thickness of the first seal may be greater than a thickness of a shingle onto which the flashing plate is positioned. Preferably, the first seal may exhibit the aforementioned thickness relation in the compressed state, namely when the flashing plate is installed on the roof. Further, the thickness of the second seal may be less or equal to a thickness of a shingle onto which the flashing plate is positioned.

In another aspect, a third seal may be arranged at the upper surface of the flashing plate on top of the flanged edge of the hole and adapted to receive at least a portion of the fastener therethrough. Thereby, the third seal may be a circular seal, wherein circular encompasses all characteristics as defined above. The third seal thereby exhibits the advantage that no water from above or water running down the fastener can leak through to the roofs' substructure.

In yet another aspect, the first seal may be tapered at a side facing the lower surface of the flashing plate, such that the first seal contacts the flanged edge of the flashing plate. Thereby, the first seal may have a conical form, such that the tapered side which faces the lower surface of the flashing plate fits into the hole and is able to contact the flanged edge of the hole. Thereby, the sealing capability between the flashing plate and the first seal is enhanced, since a better pressure distribution is given between flashing plate and first seal.

In one aspect, the first seal and the second seal may be spaced apart from each other on the lower surface of the flashing plate. When the first seal and the second seal are spaced apart, the first seal and the second seal form a gap between them. The width of the gap is thereby defined by the distance between an outer edge of the first seal and an inner edge of the second seal, wherein inner and outer refers to the distance of the edges from a center of the hole in the flashing plate, which both seals are surrounding. Thereby, both seals have an inner edge and an outer edge and the inner edge is defined to have a smaller distance from the center of the hole than the outer edge. The width of the gap may also be nearly or equal to zero, such that the first seal and the second seal may contact each other. The first seal and the second seal may also be made out of one piece, wherein however the aforementioned thickness relation is still given, in particular in the installed state of the flashing plate. Further, in order to maintain the aforementioned sealing capabilities, the gap between the first seal and the second seal should also be kept in a certain range, such that the first seal and the second seal are not spaced so far apart from each other that the second seal contacts more than one shingle.

In another aspect, the first seal and/or the second seal may be made out of ethylene propylene diene monomer rubber. However, they may also be made out of any other suitable material for forming a seal as contemplated by a person skilled in the art. Thereby, it also has to be understood that dependent upon the chosen material, the first seal may be less compressible than the second seal and that in the uninstalled state of the flashing plate, the thickness of both seals therefore may be the same or the second seal may even have a greater thickness than the first seal. For example, this may be the case if the second seal exhibits a foam like compressibility, whereas the first seal exhibits a stiffer rubber like compressibility. In this case, only in the installed state of the flashing plate, the first seal will have a greater thickness than the second seal, because the second seal will be more compressed than the first seal.

In yet another aspect, the first seal and/or the second seal may comprise at least one groove at a side facing away from the lower surface of the flashing plate, in order to enhance sealing capability. The groove may also, for example, extend throughout the complete thickness of the seal and may be specially formed as contemplated by a person skilled in the art to enhance the sealing capability, in particular adapting to different shingle characteristics. If a groove extends through the complete thickness of the first seal, it splits the first seal into two parts; if two grooves extend through the complete thickness of the first seal they split the first seal into three parts; and so on. Therefore, the present invention also encompasses that the first seal can consist of two or a plurality of parts, which are closely spaced apart from each other, but have the same thickness or at least have each a thickness greater than the thickness of the second seal.

In one aspect, the first seal and/or the second seal may also comprise a layer of bitumen at a side facing away from the lower surface of the flashing plate, also for enhanced sealing capabilities. However, it has to be understood that also any other form of adhesive material, which is contemplated by a person skilled in the art may be arranged at the side of the first seal and/or the second facing away from the lower surface of the flashing plate.

In one further aspect, the fastener used for mounting/securing equipment onto the roof may be a threaded bolt adapted for mounting/securing solar equipment onto the roof.

In one aspect, the first seal and/or the second seal may be glued to the lower surface of the flashing plate of the flashing system. Thereby, any glue as contemplated by a person skilled in the art as suitable may be used. Further, the first seal and/or second seal may also be snap fitted on the lower surface of the flashing system. Thereby, any way of mechanical clamping and/or snapping combinations may be used.

In addition the present invention also provides a method of forming a seal between a flashing system and a roof having shingles, the method comprising positioning the flashing system between two overlapping shingles. The flashing system has a flashing plate with an upper surface and a lower surface and at least one hole extending through the flashing plate, which hole can be co-aligned with a borehole in the roof for accommodating a fastener, wherein an edge of the hole extends upwardly projecting from the upper surface of the flashing plate to form a flanged edge and the hole is adapted to receive at least a portion of a fastener therethrough. A first seal is arranged at the lower surface of the flashing plate surrounding the hole and is adapted to receive at least a portion of the fastener therethrough, and a second seal is arranged at the lower surface of the flashing plate surrounding the first seal and wherein the thickness of the first seal is greater than the thickness of the second seal. Thereby, the flashing system is placed in such a way in between two shingles that the lower surface of the flashing plate contacts one of the two shingles and the upper surface of the flashing plate contacts the other of the two shingles and that the first seal is positioned into a recess of the shingle contacted by the lower surface of the flashing plate, wherein the recess is adapted to have at least a dimension corresponding to the dimension of the first seal. The method further comprises inserting a fastener into the hole through the flashing plate and the first seal and compressing the first seal and the second seal between the roof and the flashing plate thereby forming a seal between the flashing plate and the roof. In addition a third seal may be positioned and compressed between the pressure face of the fastener and the upper surface of the flashing thereby forming a seal to the weathered side of the system.

In addition the present invention also provides a method of forming a seal between a flashing system and a roof having shingles. The method comprises drilling a borehole into the roof, wherein the borehole extends through the shingles of the roof into a rafter of the roof and simultaneously removing a predetermined portion of an uppermost shingle around the hole creating a recess. The method further comprises positioning the flashing system in between two overlapping shingles. The flashing system has a flashing plate with an upper surface and a lower surface and at least one hole extending through the flashing plate, which hole can be co-aligned with the borehole in the roof, wherein an edge of the hole extends upwardly projecting from the upper surface of the flashing plate and the hole is adapted to receive at least a portion of a fastener therethrough. A first seal is arranged at the lower surface of the flashing plate surrounding the hole and is adapted to receive at least a portion of the fastener therethrough, and a second seal is arranged at the lower surface of the flashing plate surrounding the first seal and wherein the thickness of the first seal is greater than the thickness of the second seal. Thereby, the flashing system is placed in such a way in between two shingles that the lower surface of the flashing plate contacts one of the two shingles and the upper surface of the flashing plate contacts the other of the two shingles and that the first seal is positioned into a recess of the shingle contacted by the lower surface of the flashing plate, wherein the recess is adapted to have at least a dimension corresponding to the dimension of the first seal. The method further comprises inserting a fastener into the hole through the flashing plate and the first seal and compressing the first seal and the second seal between the roof and the flashing plate thereby forming a seal between the flashing plate and the roof.

The aforementioned flashing system and the method of using it presents for the first time the possibility to easily seal roof mounting equipment on a shingle roof. Thereby, the flashing system according to the present invention exhibits the advantage over the known systems that a seal is achieved not only against water coming from above and against water which has leaked in between a flashing plate and an uppermost shingle, but also from water which has leaked in between shingle layers and which can be blown upwards by heavy wind conditions. This is in particular important in heavy rainy and windy conditions or when the shingles are of a certain age and the bitumen layer in between the shingles has weakened. Thereby, the flashing system according to the present invention is also quickly mountable and easy to handle and can be produced at nearly the same costs as the known systems.

Other objects, features, and advantages of the invention will become apparent from a review of the entire specification, including the appended claims and drawings.

BRIEF DESCRIPTION OF THE DRAWINGS

FIG. 3 shows a cross-sectional view of the flashing system as shown in FIG. 1 installed on a roof with shingles.

DETAILED DESCRIPTION OF THE PREFERRED EMBODIMENT

Before any embodiment of the invention is described in detail, it is to be understood that the invention is not limited to the scope of the illustrated and described particular embodiment.

The terms "exemplary" and "exemplarily" are used herein to mean "serving as an example, instance, or illustration". Any embodiment described herein as "exemplary" or as an "example" is not necessarily to be understood as preferred or advantageously over other embodiments which fall into the scope of the invention.

Figure 1:
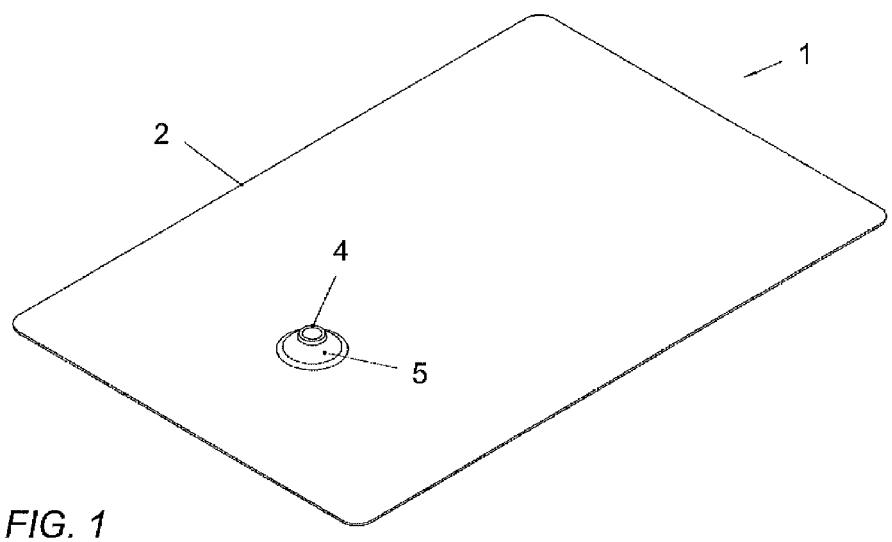
FIG. 1 shows a top view of a flashing system according to an embodiment example of the present invention.

FIG. 1 shows a top view of an exemplary embodiment of a flashing system 1 according to the invention. The flashing system 1 comprises a flashing plate with an upper surface 2. The flashing plate further comprises a hole 4 therethrough, which is adapted to receive at least a portion of a fastener—not shown—therethrough. Further, an edge of the hole 4 extends upwardly projecting away from the upper surface 2 of the flashing plate, such that a flanged edge 5 is created. The flashing plate itself has in the shown embodiment a rectangular shape with round edges. However, it has to be understood that the flashing plate also can have a different shape than illustrated in FIG. 1. Further, the flashing plate may be made out of different rigid or semi-rigid materials, for example, stainless steel, zinc, aluminum, copper, lead, plastic or a mixture thereof or an alloy. Also the flashing plate may have a coating to make it more durable. The coating may for example be a plastic coating or a paint coating.

Figure 2:
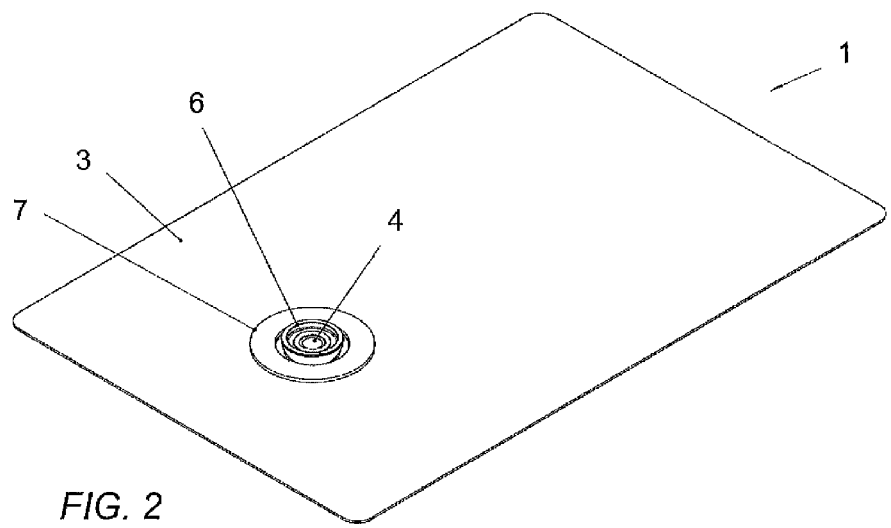
FIG. 2 shows a bottom view of the flashing system as shown in FIG. 1.

FIG. 2 shows a bottom view of the exemplary embodiment of the flashing system 1 as shown in FIG. 1. The flashing system 1 comprises a flashing plate with a lower surface 3. A first seal 6 is arranged at the lower surface of the flashing plate surrounding the hole 4 extending through the flashing plate, wherein the first seal 6 is also adapted to receive at least a portion of a fastener—not shown—therethrough. Spaced apart from the first seal 6, a second seal 7 is arranged, which surrounds the first seal 6. Thereby, the first seal 6 and the second seal 7 have different thicknesses, such that the first seal 6 projects further upwardly from the lower surface 3 of the flashing plate than the second seal 7. Thereby, the first seal 6 and the second seal 7 can for example be spaced apart from each other as shown in FIG. 2 and forming a gap between them, but it has to be understood that they may also contact each other or even may be made out of one piece. It has also to be understood that even so in FIG. 2 circular shaped seals are depicted, also other suitable forms are contemplated. Further, the first seal 6 and the second seal 7 may be made out of the same or different materials. For example, the first seal 6 and/or the second seal 7 may be made out of ethylene propylene diene monomer rubber or any other contemplated material.

Further as illustrated in FIG. 2, the first seal 6 has a groove on a side facing away from the lower surface 3 of the flashing plate for enhanced sealing capability. The second seal 7 is roughened or notched at a side facing away from the lower surface 3 of the flashing plate also for enhanced sealing capabilities. The first seal 6 and the second seal 7 may also comprise a layer of bitumen at a side facing away from the lower surface 3 of the flashing plate for enhanced sealing capabilities.

FIG. 3 shows a cross-sectional view of the flashing system 1 as shown in FIGS. 1 and 2 installed on a roof substructure 11 comprising at least one rafter 12 and shingles 13a-13e. Thereby, the flashing system 1 as depicted is installed in between shingles 13c and 13d. For installing the flashing system 1, a borehole is drilled into shingles 13b and 13c through the roof substructure 11 and into the rafter 12. Thereby, simultaneously a defined portion of shingle 13c around the borehole is removed and this removed portion has at least a dimension corresponding to the dimension of the first seal 6 of the flashing system 1. When the flashing plate of flashing system 1 is placed on top of the borehole between shingles 13c and 13d, wherein the hole 4 in the flashing plate is co-aligned with the borehole, then the first seal 6 can be positioned into the removed portion of shingle 13c. The removed portion of shingle 13c allows the first seal 6 to contact the bitumen layer of shingle 13b lying beneath shingle 13c. The second seal 7 of the flashing system 1, which surrounds the first seal 6, is positioned on top of shingle 13c, therefore between shingle 13c and the flashing plate of the flashing system 1. In the arrangement as illustrated in FIG. 3 also a third seal 9 is arranged at the upper surface 2 of the flashing plate of the flashing system 1, and is arranged on top of the flanged edge 5 of the flashing plate. Further, the third seal 9 is adapted to receive at least a portion of a fastener therethrough. As illustrated in FIG. 3, a fastener 8 is inserted through the third seal 9, through the flashing plate, through the first seal 6, through shingles 13b and 13c, and through the roof structure 11 into the rafter 12. The fastener 8 can be any fastener suitable for securing equipment, for example, solar equipment, on the roof. The fastener 8 shown in FIG. 3 comprises a thickening 10, where it contacts the third seal 9 placed on the flanged edge 5 of the flashing plate. The thickening 10 can for example be a bolt nut arranged on a thread of the fastener 8 or may be a welded bulge or any other means feasible to increase the circumference of the fastener 8. When the fastener 8 is tightened and threaded deeper into the rafter 12, then the thickening 10 exerts pressure upon the third seal 9 thereby compressing it. By compressing the third seal 9, also pressure is exerted upon the flashing plate and in turn also upon the first seal 6 and the second seal 7, such that the first seal 6 and the second seal 7 are compressed between the flashing plate and the shingle 13c, such that a seal is formed.

By use of the three different seals 6, 7, and 9, it is achieved that water can neither from above, nor from the sides get through to the roof substructure 11 or the rafter 12.

This is achieved by having the first seal 6 and the second seal 7 having two different thicknesses, such that the first seal 6 can extend through the uppermost shingle 13c onto the bitumen layer of the shingle 13b lying beneath shingle 13c, such that a seal is formed against water leaking from in between the shingles. The second seal 7 forms a seal on top of shingle 13c against water leaking from in between the flashing plate and shingle 13c. The third seal 9 forms with the fastener 8 and its thickening 10 a seal against water coming from directly above. Hence, by combining the three seals 6, 7, and 9, an overall seal is formed between roof and flashing system 1.

While the present invention has been described with reference to a particular embodiment, it should be understood that the particular embodiment is of an illustrative nature and that the scope of the invention is not limited to this particular embodiment. Many variations, modifications, additions and improvements to the particular embodiment described above are possible. It is contemplated that these variations, modifications, additions and improvements fall within the scope of the invention as detailed within the following claims.

The invention claimed is:

1. A flashing system comprising:
   a flashing plate having an upper surface and a lower surface and at least one hole extending through the flashing plate, the hole having an upwardly flanged edge projecting from the upper surface of the flashing plate and the hole is adapted to receive at least a portion of a fastener therethrough;
   a first seal arranged at the lower surface of the flashing plate surrounding the hole and adapted to receive at least a portion of the fastener therethrough;
   a second seal arranged at the lower surface of the flashing plate surrounding the first seal; and
   wherein the thickness of the first seal is greater than the thickness of the second seal and the first seal and the second seal are spaced apart from each other forming a gap between them.

2. The flashing system of claim 1, wherein the first seal and/or the second seal is a circular seal.

3. The flashing system of claim 1, wherein the thickness of the first seal is greater than a thickness of a shingle onto which the flashing plate is positioned.

4. The flashing system of claim 1, wherein the thickness of the second seal is less or equal to a thickness of a shingle onto which the flashing plate is positioned.

5. The flashing system of claim 1, wherein a third seal is arranged at the upper surface of the flashing plate on top of the hole and adapted to receive at least a portion of the fastener therethrough.

6. The flashing system of claim 1, wherein the first seal is tapered at a side facing the lower surface of the flashing plate to contact the flanged edge of the hole.

7. The flashing system of claim 1, wherein the first seal and/or the second seal is made out of ethylene propylene diene monomer rubber.

8. The flashing system of claim 1, wherein the first seal and/or the second seal comprises at least one groove at a side facing away from the lower surface of the flashing plate.

9. The flashing system of claim 1, wherein the first seal and/or the second seal comprises a layer of bitumen at a side facing away from the lower surface of the flashing plate.

10. The flashing system of claim 1, further comprising a fastener for securing solar equipment on the roof, wherein the fastener is insertable into the hole of the flashing plate.

11. The flashing system of claim 1, wherein the flashing plate is made out of aluminum.

12. The flashing system of claim 1, wherein the first seal and/or the second seal are glued to the lower surface of the flashing plate.

13. The flashing system of claim 1, wherein the first seal is less compressible than the second seal.

14. A method of forming a seal between a flashing system and a roof having shingles, the method comprising:
   positioning a flashing system according to claim 1 between two overlapping shingles, such that the lower surface of the flashing plate contacts one of the two shingles and the upper surface of the flashing plate contacts the other of the two shingles and the first seal is positioned into a recess of the shingle contacted by the lower surface of the flashing plate, wherein the recess is adapted to have a dimension at least corresponding to the dimension of first seal;
   inserting a fastener into the hole through the flashing plate and through the first seal into a borehole into a substructure of the roof; and
   compressing the first seal and the second seal between the roof and the flashing plate thereby forming a seal between the flashing plate and the roof.

* * * * *

UNITED STATES PATENT AND TRADEMARK OFFICE
CERTIFICATE OF CORRECTION

PATENT NO. : 8,549,793 B1  
APPLICATION NO. : 13/601455  
DATED : October 8, 2013  
INVENTOR(S) : Lothar Gens Page 1 of 1

It is certified that error appears in the above-identified patent and that said Letters Patent is hereby corrected as shown below:

Title page (73) Assignee: "EJOT Baubefestigung GmbH" should be -- EJOT Baubefestigungen GmbH --

Signed and Sealed this  
Twenty-sixth Day of August, 2014

Michelle K. Lee  
*Deputy Director of the United States Patent and Trademark Office*